(12) United States Patent
Niwa

(10) Patent No.: US 8,337,930 B2
(45) Date of Patent: Dec. 25, 2012

(54) PACKAGED OOLONG-TEA BEVERAGE

(75) Inventor: Sachiko Niwa, Sumida-ku (JP)

(73) Assignee: Kao Corporation, Tokyo (JP)

( * ) Notice: Subject to any disclaimer, the term of this patent is extended or adjusted under 35 U.S.C. 154(b) by 815 days.

(21) Appl. No.: 11/564,558

(22) Filed: Nov. 29, 2006

(65) Prior Publication Data
US 2007/0148308 A1 Jun. 28, 2007

(30) Foreign Application Priority Data
Dec. 27, 2005 (JP) .................................. 2005-375533

(51) Int. Cl.
A23F 3/00 (2006.01)

(52) U.S. Cl. ........ 426/597; 426/590; 426/422; 426/431; 426/433; 426/434; 426/427

(58) Field of Classification Search .................. 426/597, 426/590, 422, 431, 435, 434, 427
See application file for complete search history.

(56) References Cited

U.S. PATENT DOCUMENTS

| 5,318,986 | A | 6/1994 | Hara et al. | |
| 6,797,305 | B2 * | 9/2004 | Niino et al. | 426/435 |
| 2005/0095342 | A1 * | 5/2005 | Ogura et al. | 426/597 |
| 2006/0024421 | A1 * | 2/2006 | Kinugasa et al. | 426/597 |

FOREIGN PATENT DOCUMENTS

| JP | 57016649 A * | 1/1982 |
| JP | 60-156614 | 8/1985 |
| JP | 60192548 A * | 10/1985 |
| JP | 3-133928 | 6/1991 |
| JP | 2003-210110 | 7/2003 |
| JP | 2003333989 A * | 11/2003 |
| JP | 2004-129669 | 4/2004 |
| JP | 2004159665 A * | 6/2004 |
| JP | 2004-248672 | 9/2004 |
| JP | 2006174755 A * | 7/2006 |
| WO | WO02065846 A1 * | 8/2002 |

OTHER PUBLICATIONS

JP 2006174755 A, Niwa et al. Jul. 6, 2006, English Machine Translation.*
JP 2004-129669 A, Apr. 30, 2004, Machine translation, pp. 1-11.*
JP 2004-129669 A, Ogura et al. Machine Translation, pp. 1-11, Apr. 30, 2004.*
U.S. Appl. No. 12/183,675, filed Jul. 31, 2008, Iwasaki, et al.
U.S. Appl. No. 12/183,707, filed Jul. 31, 2008, Iwasaki, et al.
Notice of Reasons for Rejection mailed Feb. 8, 2011 in Japanese Application No. 2005-375533.
Keiichiro Muramatsu "The Science of Tea", $1^{st}$ Edition, $8^{th}$ Print, pp. 120-121, Asakura Publishing Co., Ltd., 1997.
Keiichiro Muramatsu "The Science of Tea", $1^{st}$ Edition, $8^{th}$ Print, pp. 120-121, Asakura Publishing Co. Ltd., 1997 (previously cited on Feb. 23, 2011) w/English Translation.

* cited by examiner

Primary Examiner — Jennifer McNeil
Assistant Examiner — Hong T Yoo
(74) Attorney, Agent, or Firm — Oblon, Spivak, McClelland, Maier & Neustadt, L.L.P.

(57) ABSTRACT

Provided is a packaged Oolong-tea beverage which contains an Oolong tea extract having a tannin/Brix ratio of from 200 to 265 (mg/100 mL/wt. %) and has a non-polymer catechin content of from 0.06 to 0.5 wt. %.

The packaged Oolong-tea beverage of the present invention contains a high concentration of catechins and at the same time, tastes good without losing the original taste of Oolong tea.

15 Claims, No Drawings

PACKAGED OOLONG-TEA BEVERAGE

FIELD OF THE INVENTION

The present invention relates to a packaged Oolong-tea beverage.

BACKGROUND OF THE INVENTION

Catechins are reported to be effective for suppressing an increase in the cholesterol level or inhibiting amylase activity (Patent Documents 1 and 2). In order to gain such physiological effects of catechins, an adult is required to drink four to five cups of tea a day. Thus there has been a strong demand for the development of a technology by which a high concentration of catechins is contained in a beverage so that a large amount of catechins can be consumed conveniently.
[Patent Document 1] JP-A-60-156614
[Patent Document 2] JP-A-3-133928

DISCLOSURE OF THE INVENTION

The present invention provides a packaged Oolong-tea beverage containing (A) an Oolong tea extract having a tannin/Brix ratio of from 200 to 265 (mg/100 mL/wt. %) and having a non-polymer catechin content of from 0.06 to 0.5 wt. %.

The present invention also provides a packaged Oolong-tea beverage having a non-polymer catechin content of from 0.06 to 0.5 wt. %, wherein a non-epicatechins (non-epicatechins+epicatechins) ratio in the non-polymer catechins is from 0.4 to 0.7, and a non-polymer catechins/tannin weight ratio is from 0.30 to 0.80.

DETAILED DESCRIPTION OF THE INVENTION

When an Oolong tea having a high Brix level is used simply for the purpose of obtaining an Oolong-tea beverage containing a high concentration of catechins, however, the resulting beverage has an unpleasant strange taste or harsh taste.

The present inventors carried out an investigation with the aim of obtaining a packaged Oolong-tea beverage which contains a high concentration of catechins and tastes good at the same time without losing the original taste of Oolong tea. As a result, it has been found that a packaged Oolong-tea beverage, which contains a high concentration of catechins, tastes good at the same time without losing the original taste of Oolong tea and has an excellent color tone, is obtainable by using an Oolong tea extract whose tannin content and tannin/Brix ratio are conditioned to fall within a specific range, as well as by adjusting a non-polymer catechin content in the beverage to from 0.06 to 0.5 wt %.

The packaged Oolong-tea beverage according to the present invention contains a high concentration of catechins and at the same time, has an excellent color tone and a taste which Oolong tea originally has. The color a* of the beverage is preferably from 6 to 12.

The Oolong tea extract usable in the present invention can be prepared using Oolong tea leaves obtained by semi-fermentation of tea leaves belonging to the Genus *Camellia*, for example, *C. sinensis* and *C. assamica*, or hybrids thereof, adding thereto an extraction solvent, extraction assistant or the like and subjecting the resulting mixture to a stirring extraction, kneader extraction, drip extraction or column extraction.

Specific examples of the Oolong tea include wuyi rock tea, tie guan yin, shui xian, Oolong, se zhong, and Pao Chung. Of these, tie guan yin, shui xian and Oolong are preferred.

Examples of the extraction solvent include water, organic solvents such as ethanol and organic solvent mixtures such as a mixture of water and ethanol. Of these, water is most preferred.

Batch extraction from Oolong tea leaves is carried out preferably by adding thereto water of from 70 to 100° C., more preferably from 80 to 95° C. in an amount of from 30 to 70 times, more preferably from 40 to 60 times the weight of the Oolong tea leaves. Extraction time is preferably from 1 to 30 minutes, more preferably from 2 to 20 minutes. The Oolong tea extract is isolated by filtration or the like. Continuous extraction is, on the other hand, carried out by charging Oolong tea leaves in an extraction tank, continuously supplying an extraction solvent from the upper or lower part of the extraction tank and collecting the Oolong tea extract. In this case, it is preferred to continuously supply the extraction solvent of from 70 to 100° C., more preferably from 80 to 95° C. in an amount of from 30 to 70 times, more preferably from 40 to 60 times the weight of the Oolong tea leaves over from 1 to 60 minutes, more preferably from 10 to 40 minutes.

When the Oolong tea extract is prepared, use of an alkali metal carbonate in combination is preferred, because it enables extraction of a large amount of flavor components of the Oolong tea. Examples of the alkali metal carbonate include sodium carbonate, sodium bicarbonate and potassium carbonate. Of these, sodium bicarbonate is preferred. The alkali metal carbonate is added to the extraction solvent preferably in an amount of from 0.2 to 20 wt. %, more preferably from 1 to 19 wt. %.

During extraction, a salt of an organic acid such as sodium ascorbate can be added to water in advance from the standpoint of oxidation stability. A method of extracting in a so-called non-oxidizing atmosphere while removing dissolved oxygen by boiling for deaeration or feeding of an inert gas such as nitrogen gas may be used in combination.

A tannin/Brix content ratio (tannin (mg/100 mL)/Brix (wt. %)) in the Oolong tea extract thus prepared is from 200 to 265, preferably from 205 to 265, more preferably from 220 to 255. The term "tannin (mg/100 mL)/Brix (wt. %)" as used herein means a quotient obtained by dividing the tannin content by the Brix value. In the present invention, the tannin content is preferably measured by the ferrous tartrate method, while the Brix value is measured by a refractometer. When the ratio is less than 200, the resulting Oolong-tea beverage does not have a satisfactory taste, while when it exceeds 265, the beverage inevitably has a harsh taste derived from Oolong tea leaves.

By adjusting the non-polymer catechin/tannin ratio to a range of from 0.30 to 0.80, preferably from 0.40 to 0.80, more preferably from 0.40 to 0.70, the harsh taste derived from Oolong tea can be masked.

In order to adjust the tannin/Brix content ratio to a range from 200 to 265 or the non-polymer catechin/tannin content ratio to a range of from 0.30 to 0.80, it is preferred to prepare the beverage by using the extraction solvent in an amount of from 40 to 60 times the weight of Oolong tea leaves, setting the extraction time to from 1 to 60 minutes, and carrying out, as post treatment, filtration through a microfiltration membrane such as zeta membrane.

The packaged Oolong-tea beverage of the present invention contains from 0.06 to 0.5 wt. %, preferably from 0.07 to 0.4 wt. %, more preferably from 0.08 to 0.3 wt. %, even more preferably from 0.09 to 0.3 wt. %, even more preferably from 0.1 to 0.2 wt. % of non-polymer catechins which are nonpolymers and dissolved in water. The non-polymer catechin content within the above-described range are preferred because they facilitate ingestion of a large amount of non-polymer catechins and contribute to the good taste and color tone just after preparation of the beverage.

Accordingly, a daily intake per adult of the packaged Oolong-tea beverage of the present invention is, in terms of non-polymer catechins, preferably 300 mg or greater, more preferably 450 mg or greater, even more preferably 500 mg or greater. In order to assure the daily necessary intake per adult, one packaged Oolong-tea beverage (from 350 to 500 mL) of the present invention contains preferably 300 mg or greater, more preferably 450 mg or greater, even more preferably 500 mg or greater of non-polymer catechins.

The term "non-polymer catechins" as used herein is a generic term, which collectively encompasses non-epicatechins such as catechin, gallocatechin, catechin gallate and gallocatechin gallate, and epicatechins such as epicatechin, epigallocatechin, epicatechin gallate, and epigallocatechin gallate.

The proportion of the gallates consisting of catechin gallate, epicatechin gallate, gallocatechin gallate and epigallocatechin gallate in the entire non-polymer catechins is preferably from 35 to 100 wt. % from the standpoint of the effectiveness of the physiological effects of the non-polymer catechins. The proportion is more preferably from 35 to 98 wt. %, even more preferably from 35 to 95 wt. %, because the beverage having such a proportion can be seasoned easily.

A non-epicatechin ratio (non-epicatechins/(non-epicatechins+epicatechins)) in the non-polymer catechins is preferably from 0.40 to 0.70, more preferably from 0.45 to 0.65, because a change in the color tone after long-term storage can be suppressed within the above-described range.

The packaged Oolong-tea beverage of the present invention has a pH at 25° C. of preferably from 2 to 6.5, more preferably from 3.5 to 6.5, even more preferably from 5.5 to 6.5 from the viewpoint of the taste of the Oolong tea beverage.

The packaged Oolong-tea beverage of the present invention may contain a bitterness suppressor. Cyclodextrins are preferred examples of it. As the cyclodextrin, α-, β- or γ-cyclodextrin or branched α-, β- or γ-cyclodextrin may be used. In the beverage of the present invention, the cyclodextrin may be added preferably in an amount of from 0.01 to 0.5 wt. %, preferably from 0.01 to 0.3 wt. %. Of these, β-cyclodextrin is preferred.

To the packaged Oolong-tea beverage of the present invention, it is possible to add, either singly or in combination, additives such as antioxidants, flavors, various esters, organic acid salts, inorganic acids, inorganic acid salts, colorants, emulsifiers, preservatives, seasonings, sweeteners, acidulants, vitamins, fruit extracts, vegetable extracts, flower honey extracts, and quality stabilizers.

Examples of the inorganic acid salt include disodium phosphate and sodium metaphosphate. It is added to the beverage in an amount of from 0.0001 to 0.5 wt. %, preferably from 0.0001 to 0.3 wt. %.

Examples of the sweetener include sugar, glucose, fructose, isomerized liquid sugar, glycyrrhizin, stevia, aspartame, fructo-oligosaccharide and galacto-oligosaccharide.

Examples of the acidulant include edible acids such as malic acid, citric acid, tartaric acid and fumaric acid. The acidulant may be used for regulating the pH of the beverage of the present invention. As a pH regulator, an organic or inorganic edible acid may be used. The acid may be used either in a non-dissociated form or in the form of its salt. Examples of the salt include potassium or sodium hydrogenphosphate and potassium or sodium dihydrogenphosphate. Preferred acids include edible organic acids such as citric acid, malic acid, fumaric acid, adipic acid, phosphoric acid, gluconic acid, tartaric acid, ascorbic acid, acetic acid and phosphoric acid, and mixtures thereof, with citric acid and malic acid being preferred. The acidulant is also useful as an antioxidant for stabilizing the components in the beverage. Examples of commonly employed antioxidants include ascorbic acid and EDTA (ethylenediaminetetraacetic acid) and salts thereof, and plant extracts.

As the vitamins, vitamin A, vitamin C., and vitamin E can be added. Other vitamins such as vitamin D and vitamin B may also be added.

Similar to general beverages, a molded package made of polyethylene terephthalate as a principal component (a so-called PET bottle), a metal can, a paper container combined with a metal foil or plastic film, a bottle or the like may be used as a package for preparing the packaged Oolong tea beverage of the present invention. Packages from which no iron ions are eluted are preferred, because a sulfite component acts on iron to generate hydrogen sulfide. A so-called PET bottle is preferred as a transparent bottle and it is more preferred because it can be recapped. The term "packaged beverage" as used herein means a beverage that can be consumed without dilution.

The packaged Oolong-tea beverage of the present invention can be produced, for example, by filling the beverage in a container such as a metal can and, when heat sterilization is feasible, conducting heat sterilization under sterilization conditions as prescribed in the Food Sanitation Act of Japan. For packages, such as PET bottles and paper containers, which cannot be subjected to retort sterilization, a process of subjecting the beverage to high-temperature short-time sterilization, for example, by a plate-type heat exchanger under similar sterilization conditions to those described above, cooling the resulting beverage to a specific temperature and then filling it in a package is employed. Under aseptic conditions, additional components may be filled in the container in which the beverage has already been contained. After heat sterilization under neutral conditions, the pH of the beverage may be brought back to acidic under aseptic conditions.

EXAMPLES

Analysis of Catechin Content

A packaged beverage which had been filtered through a filter (0.8 μm) and diluted with distilled water was analyzed using high-performance liquid chromatograph ("SCL-10AVP", product of Shimadzu Corporation) equipped with "L-Column TM ODS" (packed column for octadecyl-introduced liquid chromatograph, 4.6 mm×250 mm: product of Chemicals Evaluation and Research Institute, Japan) at a column temperature of 35° C. by a gradient method. A distilled aqueous solution containing 0.1 mol/L of acetic acid was used as a mobile phase solution A and an acetonitrile solution containing 0.1 mol/L of acetic acid was used as a mobile phase solution B. Analysis was conducted under the conditions of a sample injection amount of 20 μL and an UV detector wavelength of 280 nm.

Analysis of Tannin Content

A tannin content is determined in terms of gallic acid in accordance with the ferrous tartrate method by using ethyl gallate as a standard solution (referentice literature: "Green Tea Polyphenols", Technology Series for the Effective Utilization of Functional Ingredients for Beverages and Foods, No. 10). A sample (5 mL) was stained with 5 mL of a standard ferrous tartrate solution. With a phosphate buffer, the volume of the thus-stained sample was adjusted to 25 mL. Its absorbance was measured at 540 nm, and from a calibration curve for ethyl gallate, a tannin content was determined. Preparation of the standard ferrous tartrate solution: The volume of 100 mg of ferrous sulfate heptahydrate and 500 mg of potassium sodium tartrate (Rochelle salt) was adjusted to 100 mL with distilled water. Preparation of the phosphate buffer: A $1/15$ mol/L disodium hydrogen phosphate solution and a $1/15$ mol/L sodium dihydrogen phosphate solution were mixed to adjust the pH to 7.5.

Analysis of Brix

A Brix value as measured by a refractometer was used. As the refractomer, "RX-5000α" (product of ATAGO) was employed.

The following examples further describe and demonstrate embodiments of the present invention. The examples are given solely for the purpose of illustration and are not to be construed as limitations of the present invention.

Example 1

Preparation of an Oolong Tea Extract

Oolong tea leaves (33.3 kg) was added to 2000 L (60 times the weight of the tea leaves) of hot water of 90° C. having a pH adjusted to 8.5 with sodium bicarbonate water. The resulting mixture was then stirred and extracted in a kneader (rotation at 13 r/min for 5 minutes) to yield a crude extract. The residue of the tea leaves was removed by filtration through a filter (20 mesh) and centrifugal separation, whereby an Oolong tea extract was obtained. The extract was then diluted to about 1.2 times its original volume with ion exchange water to yield an Oolong tea extract 1. The tannin content, Brix and tannin/Brix ratio in the Oolong tea extract 1 were 102.4 mg/100 mL, 0.42 wt. % and 244 (mg/100 mL/wt. %), respectively.

Example 2

Preparation of Oolong Tea Extract

Oolong tea leaves (133.3 kg) was added to 2000 L (15 times the weight of the tea leaves) of hot water of 90° C. having a pH adjusted to 8.5 with sodium bicarbonate water. The resulting mixture was then stirred and extracted in a kneader (rotation at 13 r/min for 5 minutes) to yield a crude extract. The residue of the tea leaves was removed by filtration through a filter (20 mesh) and centrifugal separation, whereby an Oolong tea extract was obtained. The extract was then diluted to about 5 times its original volume with ion exchange water to yield an Oolong tea extract 3. The tannin content, Brix and tannin/Brix ratio in the Oolong tea extract 3 were 101.5 mg/100 mL, 0.50 wt. % and 203 (mg/100 mL/wt. %), respectively.

Comparative Example 1

Preparation of Oolong Tea Extract

Oolong tea leaves (20 kg) were added to 2000 L (100 times the weight of the tea leaves) of hot water of 100° C. having a pH adjusted to 8.5 with sodium bicarbonate water. The resulting mixture was then stirred and extracted in a kneader (rotation at 13 r/min for 5 minutes) to yield a crude extract. The residue of the tea leaves was removed by filtration through a filter (20 mesh) and centrifugal separation, whereby an Oolong tea extract 2 was obtained. The tannin content, Brix and tannin/Brix ratio in the Oolong tea extract 2 were 98.3 mg/100 mL, 0.35 wt. % and 281 (mg/100 mL/wt. %), respectively.

Packaged beverages were obtained using the Oolong tea extracts obtained in Example 1, Example 2 and Comparative Example 1, respectively. The beverages thus obtained were evaluated for their taste and the results are shown in Table 1.

TABLE 1

|  | Example 1 | Example 2 | Comparative Example 1 |
|---|---|---|---|
| Extract/tea leaves (weight ratio) | 60 | 15 | 100 |
| Extraction method | Kneader extraction | Kneader extraction | Kneader extraction |
| Extraction temperature (° C.) | 90 | 90 | 100 |
| Analysis results |  |  |  |
| Brix (wt. %) | 0.42 | 0.50 | 0.35 |
| Tannin (mg/100 mL) | 102.4 | 101.5 | 98.3 |
| Tannin/Brix ratio (mg/100 mg/wt. %) | 244 | 203 | 281 |
| Turbidity | 0.076 | 0.088 | 0.074 |
| L | 75.7 | 72.4 | 80.3 |
| a | 7.8 | 10.8 | 3.1 |
| b | 41.1 | 39.0 | 39.5 |
| Non-polymer catechins in the beverage * | 63.2 | 64.2 | 63.5 |
| Evaluation of taste | 1 | 2 | 3 |

*: mg/100 mL
Criteria for taste:
1. Having a rich aroma and free from a strange or harsh taste
2: Having an aroma typical of Oolong tea
3: Having a strong harsh taste of Oolong tea It has thus been confirmed that the packaged Oolong-tea beverage of the present invention can retain the original taste of Oolong as excellent, while containing a high concentration of non-polymer.

The invention claimed is:

1. A packaged Oolong-tea beverage, which comprises an Oolong tea extract having a tannin/Brix ratio of from 200 to 265 mg/100 mL/wt. % a non-polymer catechin content of from 0.06 to 0.5 wt. % and a weight ratio of non-polymer catechins/tannin of from 0.30 to 0.70, wherein the Oolong tea extract is prepared in a Kneader extraction wherein extraction solvent is added in an amount of from 40 to 70 times the weight of Oolong tea leaves.

2. The packaged Oolong-tea beverage according to claim 1, wherein the non-polymer catechins have a non-epicatechins/(non-epicatechins+epicatechins) ratio of from 0.4 to 0.7.

3. The packaged Oolong tea beverage according to claim 1, wherein said Oolong tea extract contains 0.2 to 20 wt. % alkali metal carbonate.

4. The packaged Oolong tea beverage according to claim 1, wherein the tannin/Brix ratio of from 220 to 255 mg/100 mL/wt. %.

5. The packaged Oolong tea beverage according to claim 1, wherein the non-polymer catechin content ranges from 0.07 to 0.4 wt. %.

6. The packaged Oolong tea beverage according to claim 1, wherein the non-polymer catechin content ranges from 0.09 to 0.3 wt. %.

7. The packaged Oolong tea beverage according to claim 1, wherein the proportion of gallates in the non-polymer catechins ranges from 35 to 100 wt. %.

8. The packaged Oolong tea beverage according to claim 1, wherein the proportion of gallates in the non-polymer catechins ranges from 35 to 98 wt. %.

9. The packaged Oolong tea beverage according to claim 1, wherein the proportion of gallates in the non-polymer catechins ranges from 35 to 95 wt. %.

10. A packaged Oolong-tea beverage having a non-polymer catechin content of from 0.06 to 0.5 wt. %, which comprises the non-polymer catechins have a non-epicatechins/(non-epicatechins+epicatechins) ratio of from 0.4 to 0.7 and a non-polymer catechins/tannin weight ratio is from 0.30 to 0.70, wherein the Oolong tea extract is prepared in a Kneader extraction wherein extraction solvent is added in an amount of from 40 to 70 times the weight of Oolong tea leaves.

11. The packaged Oolong-tea beverage according to claim 10, obtained by incorporating an Oolong tea extract having a tannin/Brix ratio of from 200 to 265 mg/100 mL/wt. %.

12. The packaged Oolong tea beverage according to claim 10, wherein the non-polymer catechins/tannin weight ratio is from 0.30 to 0.63.

13. The packaged Oolong tea beverage according to claim 10, wherein the proportion of gallates in the non-polymer catechins ranges from 35 to 100 wt. %.

14. The packaged Oolong tea beverage according to claim 10, wherein the proportion of gallates in the non-polymer catechins ranges from 35 to 98 wt. %.

15. The packaged Oolong tea beverage according to claim 10, wherein the proportion of gallates in the non-polymer catechins ranges from 35 to 95 wt. %.

\* \* \* \* \*